United States Patent [19]

Nakagawa

[11] Patent Number: 4,556,690

[45] Date of Patent: Dec. 3, 1985

[54] ACETAL RESIN COMPOSITION

[75] Inventor: Mikio Nakagawa, Hiroshima, Japan

[73] Assignee: Mitsui Petrochemical Industries, Ltd, Tokyo, Japan

[21] Appl. No.: 606,613

[22] Filed: May 3, 1984

[30] Foreign Application Priority Data

May 10, 1983 [JP] Japan ................................. 58-80144
Jan. 13, 1984 [JP] Japan ................................. 59-3531

[51] Int. Cl.$^4$ ...................... C08L 29/14; C08L 51/06
[52] U.S. Cl. ..................................... 525/64; 525/282; 525/285; 525/296; 525/301
[58] Field of Search ................... 525/57, 60, 64, 301, 525/285, 309, 292, 296, 282, 302

[56] References Cited

U.S. PATENT DOCUMENTS

| | | | |
|---|---|---|---|
| 2,775,572 | 12/1956 | Fisk | 525/57 |
| 3,526,680 | 9/1970 | Cherdron | 525/64 |
| 3,642,940 | 2/1972 | Burg et al. | 525/64 |
| 4,296,216 | 10/1981 | Sakano et al. | 525/64 |

FOREIGN PATENT DOCUMENTS 1964156 6/1971 Fed. Rep. of Germany ........ 525/64

Primary Examiner—Allan M. Lieberman
Attorney, Agent, or Firm—Sherman & Shalloway

[57] ABSTRACT

An acetal resin composition comprising (A) an acetal resin and (B) 1 to 200 parts by weight, per 100 parts by weight of the acetal resin (A), of at least one modified alpha-olefin polymer, said modified alpha-olefin polymer (B) being a graft-copolymerization product of 100 parts by weight of an alpha-olefin polymer and 0.01 to 10 parts by weight of an unsaturated carboxylic acid or its derivative.

18 Claims, No Drawings

ACETAL RESIN COMPOSITION

This invention relates to an acetal resin composition. More specifically, it relates to a toughened acetal resin composition having excellent rigidity, flexural strength, impact strength, heat resistance and moldability and being free from delamination.

Acetal resins are expected to have a large demand as engineering plastics because of their superior heat resistant properties and mechanical properties. The acetal resins are characterized by their usability within a broad temperature range because their mechanical properties depend little upon temperature. They, however, have the defect that they have low impact strength, particularly low notched impact strength, and residual stresses during molding or fine scars exist in the molded articles of the acetal resins, and therefore they are susceptible to destruction and unsuitable for production of machine parts such as gears, bolts and nuts and molded articles of complex shapes. In order, therefore, to increase the demand for the acetal resins, it has been strongly desired to improve their impact strength.

Many attempts have heretofore been made to improve the impact strength and other properties of the acetal resins. They include, for example, (i) a method involving incorporation of unsaturated rubbers as disclosed in Japanese Patent Publications Nos. 12674/1970 and 18023/1970; (ii) a method involving incorporation of an alpha-olefin polymer such as polyethylene, polypropylene, polybutene, ethylene/alpha-olefin elastomeric copolymers and a mixture of an alpha-olefin polymer and an ethylene/vinyl monomer copolymer as disclosed in Japanese Patent Publications Nos. 2730/1966, 19498/1967 and 20376/1968 and Japanese Laid-Open Patent Publications Nos. 15954/1973, 40346/1974 and 103556/1975; and (iii) a method involving incorporation of a polar group-containing alpha-olefin copolymer such as ethylene/vinyl acetate copolymer, a saponification product or saponification-acetalization product of ethylene/vinyl acetate copolymer, an ethylene/(meth)acrylate ester copolymer, and a metal neutralization salt of an alpha-olefin/$\alpha,\beta$-unsaturated carboxylic acid copolymer as disclosed in Japanese Laid-Open Patent Publications Nos. 22669/1968, 6134/1968, 26231/1970 and 18023/1970. The method (i) has the defect that an acetal resin composition obtained by incorporating an unsaturated rubber has very much reduced heat resistance and weatherability. The method (ii) has the defect that since the affinity of the acetal resin for the alpha-olefin polymer is poor, even a molded article prepared from the acetal resin composition which has been kneaded fully is susceptible to delamination and does not have sufficient mechanical strength. The method (iii) can improve the impact strength of an acetal resin composition obtained by incorporating the polar group-containing alpha-olefin copolymer to some extent. But it is still insufficient, and in particular, the notched Izod impact strength of the resulting composition cannot be so much improved.

The present inventors extensively made investigations on the development of a toughened acetal resin composition having excellent properties. These investigations have led to the discovery that when a specific modified alpha-olefin copolymer is incorporated into an acetal resin, there can be obtained an acetal resin which has markedly improved impact strength, excellent heat resistance, mechanical properties, weatherability and moldability and good resistance to delamination.

According to this invention, there is provided an acetal resin composition comprising (A) an acetal resin and (B) 1 to 200 parts by weight, per 100 parts by weight of the acetal resin, of at least one modified alpha-olefin polymer, said modified alpha-olefin polymer (B) being a graft-copolymerization product of 100 parts by weight of an alpha-olefin polymer and 0.01 to 10 parts by weight of an unsaturated carboxylic acid or its derivative.

The "acetal resin", used as matrix in the resin composition of this invention, denotes various known homopolymers or copolymers which are generally addition polymers of formaldehyde. The polymer chain excepting its end portions has the general formula $-CH_2-O)_{\overline{m}}$. The polymer chain composed of methylene-oxygen linkages may have a moiety of the general formula

in which $R_1$ and $R_2$ are inert substituents which do not induce undesirable reactions in the polymer. The acetal resin includes homopolymers of such monomers as formaldehyde, trioxane and tetraoxane, copolymers of two or more of these monomers which each other, and copolymers of at least one such monomer with at least one comonomer selected from cyclic ethers, cyclic esters and vinyl compounds. Examples of the cyclic ether that can be used to prepare the aforesaid copolymers are ethylene oxide, propylene oxide, oxacyclobutane and 1,3-dioxolane. Examples of the cyclic esters are $\beta$-propiolactone and gamma-butyrolactone. Examples of the vinyl compounds include isobutylene, styrene, vinyl methyl ether, vinyl acetate, ethyl acetate and methyl methacrylate. Thus, specific examples of the aforesaid copolymers include trioxane/ethylene oxide copolymer and trioxane/1,3-dioxolane copolymer.

Suitable acetal resins generally contain at least 80 mole %, preferably at least 90 mole %, of oxymethylene units in the main chain. The acetal resins generally have a melt flow rate, MFR (according to ASTM D-1238-79 at 190° C. and under a load of 2160 g), of 0.1 to 50 g/10 min., preferably 0.2 to 30 g/10 min., more preferably 1.0 to 20 g/10 min.

The "modified alpha-olefin polymer" to be incorporated into the acetal resin in accordance with this invention is obtained by graft-copolymerizing 100 parts of a substrate alpha-olefin polymer composed mainly of alpha-olefin units and 0.01 to 10 parts by weight, preferably 0.1 to 5 parts by weight, more preferably 0.2 to 3 parts by weight, of an unsaturated carboxylic acid or its derivative. If the proportion of the unsaturated carboxylic acid units or derivatives thereof grafted in the modified alpha-olefin polymer is less than 0.01 part by weight, the impact strength of the resulting acetal resin composition is reduced and the composition becomes susceptible to delamination. If, on the other hand, the proportion of the grafting units exceeds 10 parts by weight, the crosslinking degree of the graft-modified product increases, and its effect of improving the impact strength of the acetal resin is reduced.

The unsaturated carboxylic acid as a grafting monomer component constituting the modified alpha-olefin polymer includes aliphatic and alicyclic unsaturated carboxylic acids that contain at least one, usually only one, ethylenically unsaturated bond per molecule, at least one, preferably 1 to 2, carboxyl group, and preferably 3 to 20, more preferably 3 to 10 carbon atoms. Specific examples of the unsaturated carboxylic acids include acrylic acid, methacrylic acid, α-ethylacrylic acid, maleic acid, fumaric acid, itaconic acid, citraconic acid, tetrahydrophthalic acid, endocisbicyclo[2.2.1-]hept-5-ene-2,3-dicarboxylic acid (Nadic Acid ®), and methyl-endocisbicyclo[2.2.1]hept-5-ene-2,3-dicarboxylic acid (Methyl Nadic Acid ®).

The derivatives of the unsaturated carboxylic acids include their anhydrides, lower alkyl esters, amides, imides and halides. The anhydrides are preferred. Specific examples of these derivatives are maleic anhydride, citraconic anhydride, itaconic anhydride, tetrahydrophthalic anhydride, Nadic Anhydride, Nadic Methyl Anhydride, monomethyl maleate, dimethyl maleate, dimethyl itaconate, dimethyl citraconate, maleimide and malenyl chloride.

Among the above unsaturated carboxylic acids or their derivatives, maleic acid and Nadic Acid and their anhydrides are preferred.

The alpha-olefin polymer forming a substrate for the modified alpha-olefinic polymer may be amorphous or low crystalline polymers containing alpha-olefin units as a main component, or crystalline polymers containing alpha-olefin units as a main component.

When the substrate alpha-olefin polymer is an amorphous or low crystalline alpha-olefin polymer, the alpha-olefin polymer may be an amorphous or low crystalline elastomeric polymer containing alpha-olefinic units as a main component. It includes copolymers of at least two alpha-olefins with each other, or copolymers of a major proportion (generally at least 80 mole %, preferably 85 to 99 mole %) of at least one alpha-olefin and a minor proportion (generally not more than 20 mole %, preferably 15 to 1 mole %) of at least one diene copolymer. Examples of the alpha-olefins constituting these copolymers are alpha-olefins having 2 to 20 carbon atoms, particularly 2 to 18 carbon atoms, such as ethylene, propylene, 1-butene, 1-pentene, 4-methyl-1-pentene, 1-hexene, 1-octene, 1-decene and 1-dodecene. Examples of the diene to be copolymerized with the alpha-olefins are non-conjugated dienes having 4 to 20 carbon atoms, preferably 4 to 15 carbon atoms, such as 1,4-hexadiene, dicyclopentadiene, 5-ethylidene-2-norbornene and 2,5-norbornadiene, and conjugated dienes having 4 to 20 carbon atoms, preferably 4 to 15 carbon atoms, such as butadiene, isoprene and piperylene.

Accordingly, illustrative of the alpha-olefinic elastomeric polymers are alpha-olefin elastomeric copolymers such as ethylene/propylene copolymer, ethylene/1-butene copolymer, ethylene/4-methyl-1-pentene copolymer, ethylene/1-hexene copolymer, ethylene/1-octene copolymer, ethylene/1-decene copolymer, propylene/ethylene copolymer, propylene/1-butene copolymer, propylene/4-methyl-1-pentene copolymer, propylene/1-octene copolymer, propylene/1-decene copolymer and propylene/1-dodecene copolymer; and alpha-olefin/non-conjugated elastomeric copolymers such as ethylene/propylene/1,4-hexadiene copolymer, ethylene/propylene/dicyclopentadiene copolymer, ethylene/propylene/5-ethylidene-2-norbornene copolymer, ethylene/propylene/2,5-norbornadiene copolymer, ethylene/1-butene/dicyclopentadiene copolymer, ethylene/1-butene/1,4-hexadiene copolymer, and ethylene/1-butene/5-ethylidene-2-norbornene copolymer.

The alpha-olefin elastomeric polymers generally have a degree of crystallinity of not more than 30%, preferably not more than 20%, and more preferably 1 to 19%. Desirably, these polymers have an intrinsic viscosity $[\eta]$ of generally 0.5 to 7 dl/g, preferably 0.9 to 5 dl/g, more preferably 0.9 to 3 dl/g. Furthermore, the alpha-olefin elastomer polymers desirably have a glass transition temperature (Tg) of usually not more than 0° C., preferably not more than −10° C. Advantageously, these polymers have a molecular weight distribution ($\overline{M}w/\overline{M}n$) of 1.5 to 30, preferably 2.0 to 25, more preferably 3.0 to 20.

When the alpha-olefin polymer constituting a substrate for the modified alpha-olefin polymer is a crystalline alpha-olefin polymer, the alpha-olefin polymer may be a homopolymer of an alpha-olefin, a copolymer of at least two alpha-olefins with each other, or a copolymer of a major proportion (generally at least 60 mole %, preferably 70 to 99 mole %) of at least one alpha-olefin and a minor proportion (generally not more than 40 mole %, preferably 30 to 1 mole %) of at least one polar vinyl monomer. Examples of the alpha-olefin constituting the crystalline alpha-olefin polymer are alpha-olefins having 2 to 20 carbon atoms, preferably 2 to 18 carbon atoms, such as ethylene, propylene, 1-butene, 1-pentene, 4-methyl-1-pentene, 1-hexene, 1-octene, 1-decene, and 1-dodecene. Examples of the polar vinyl monomer include vinyl acetate, acrylic acid, methacrylic acid, acrylic acid esters, methacrylic acid esters, various metal salts of acrylic acid and various metal salts of methacrylic acid.

Thus, examples of the crystalline alpha-olefin polymer include polyethylene, polypropylene, poly-1-butene, poly-4-methyl-1-pentene, ethylene/propylene copolymer, ethylene/1-butene copolymer, ethylene/1-pentene copolymer, ethylene/4-methyl-1-pentene copolymer, ethylene/1-octene copolymer, ethylene/1-decene copolymer, ethylene/1-dodecene copolymer, ethylene/vinyl acetate copolymer, ethylene/methyl (meth)acrylate copolymer, ethylene/(meth)acrylic acid copolymer, and ethylene/(meth)acrylic acid salt copolymer.

These crystalline alpha-olefin polymers may generally have a degree of crystallinity of at least 30%, preferably 35 to 80%, more preferably 40 to 75%. Desirably, they have an intrinsic viscosity $[\eta]$, in decalin at 135° C., of generally 0.5 to 7 dl/g, preferably 0.7 to 5 dl/g, more preferably 0.9 to 3 dl/g. Furthermore, these crystalline alpha-olefin polymers can generally have a melting point of about 60° to about 300° C., preferably about 80° to about 280° C., more preferably about 90° to about 250° C. The melting point can be measured by using a differential scanning calorimeter (D.S.C. model II; supplied by Perkin-Elmer Co.) at a temperature elevating rate of 10° C./min. These crystalline alpha-olefin polymers may also have a molecular weight distribution ($\overline{M}w/\overline{M}n$) of generally 1.5 to 30, preferably 2.0 to 25, more preferably 3 to 20.

Among the above-exemplified substrate alpha-olefin polymers, especially preferred for use in this invention are ethylene/propylene copolymer, ethylene/1-butene copolymer, ethylene/propylene/diene terpolymer, and ethylene/1-butene/diene terpolymer.

Graft copolymerization of the substrate alpha-olefin polymer with the aforesaid grafting monomer (unsaturated carboxylic acid or its derivative) can be carried out by methods known per se. For example, there can be used a method which comprises melting the alpha-olefin polymer, adding the graft monomer to the molten polymer, and performing graft-copolymerization, or a method which comprises adding the grafting monomer to the alpha-olefin polymer dissolved in a solvent, and then performing graft-copolymerization. In either case, to graft the grafting monomer efficiently to the substrate alpha-olefin polymer, the reaction is preferably carried out in the presence of a radical initiator. The graft copolymerization reaction is usually carried out at a temperature of 60° to 350° C. The proportion of the radical initiator is usually 0.01 to 20 parts by weight, preferably 0.05 to 5 parts by weight, per 100 parts by weight of the alpha-olefin polymer. Examples of the radical initiator are organic peroxides, organic peresters and azo compounds.

The resulting modified alpha-olefin polymer so prepared is dispersed in the acetal resin matrix to play a role of a toughener which improves the properties, such as impact strength, rigidity and flexural strength, of the acetal resin. The modified alpha-olefin polymers as such a toughener can have a degree of crystallinity of generally 0 to 85%, preferably 1 to 80%, more preferably 2 to 75%, an intrinsic viscosity in decalin at 135° C. of generally 0.5 to 7 dl/g, preferably 0.7 to 5 dl/g, more preferably 0.9 to 3 dl/g, and a molecular weight distribution ($\overline{M}w/\overline{M}n$) of generally 1.5 to 30, preferably 2.0 to 25, more preferably 3 to 20. Suitable as the modified alpha-olefin polymer used in this invention are amorphous or low crystalline modifed alpha-olefin elastomeric polymers having a degree of crystallinity of not more than 30%. Especially suitable modified alpha-olefin elastomeric polymers for use in this invention have a degree of crystallinity of generally not more than 20%, preferably 1 to 19%, an intrinsic viscosity $[\eta]$ in decalin at 135° C. of generally 0.5 to 7 dl/g, preferably 0.7 to 5 dl/g, a molecular weight distribution ($\overline{M}w/\overline{M}n$) of generally 1.5 to 30, preferably 2.0 to 25, and a glass transition temperature of generally not more than 0° C., preferably not more than −10° C.

The use of the crystalline modified alpha-olefin polymer can also leads to an improvement on the impact strength of acetal resins. For example, there can be used, as required, modified alpha-olefin polymers which have a degree of crystallinity of generally 85 to 30%, preferably 80 to 35%, an intrinsic viscosity $[\eta]$ in decalin at 135° C. of generally 0.5 to 7 dl/g, preferably 0.7 to 5 dl/g, a molecular weight distribution ($\overline{M}w/\overline{M}n$) of generally 1.5 to 30, preferably 2.0 to 25, and a melting point of generally 60° to 300° C., preferably 80° to 280° C.

Such a crystalline modified alpha-olefin polymer may be used as a blend with the aforesaid amorphous or low crystalline modified alpha-olefin polymer. Needless to say, a blend of two or more of the amorphous or low crystalline modified alpha-olefin polymers, or a blend of two or more of the crystalline modified alpha-olefin polymers may also be used. Conveniently, the polymers are mixed so that the resulting blend has a degree of crystallinity of generally not more than 50%, preferably 10 to 45%, and more preferably 15 to 40%. The degree of crystallinity of the blend can be determined by an X-ray diffraction method (23° C.).

Preferably, the modified alpha-olefin polymer or its mixture to be dispersed in the acetal resin matrix in accordance with this invention has a tensile modulus of generally 5 to 17,000 kg/cm$^2$, preferably 10 to 5,000 kg/cm$^2$, more preferably 30 to 3,000 kg/cm$^2$.

In preparing the resin composition of this invention, the modified alpha-olefin polymer is incorporated in an amount of 1 to 200 parts by weight, preferably 5 to 100 parts by weight, more preferably 10 to 80 parts by weight, per 100 parts by weight of the acetal resin to be toughened. If the proportion of the modified alpha-olefin polymer exceeds 200 parts by weight, the resulting acetal resin has reduced rigidity and flexural strength. If it is less than 1 part by weight, the impact strength of the resulting resin cannot be improved.

In addition to the acetal resin (A) and the modified alpha-olefin polymer (B) as essential ingredients, the acetal resin composition of this invention may also contain another resin component, for example at least one unmodified alpha-olefin polymer. The unmodified alpha-olefin polymer that can be incorporated is, for example, any one of the amorphous or low crystalline alpha-olefin elastomer polymers or the crystalline alpha-olefin polymers exemplified hereinabove as the substrate of the modified alpha-olefin polymers. The unmodified alpha-olefin polymer may be the same or different in kind as or from the substrate resin of the modified alpha-olefin polymer. The proportion of the unmodified alpha-olefin polymer may generally be 1 to 1000 parts by weight, preferably 10 to 500 parts by weight, per 100 parts by weight of the modified alpha-olefin polymer (B). Desirably, the unmodified alpha-olefin polymer is incorporated so that the amount of the unsaturated carboxylic acid units or the derivatives thereof as a grafting monomer is usually 0.01 to 8% by weight, preferably 0.05 to 5% by weight, based on the total weight of the modified alpha-olefin polymer and the alpha-olefin polymer.

The acetal resin composition can be prepared by melting and kneading the aforesaid ingredients by methods to be described. In the acetal resin composition, a toughening polymer phase composed of at least one modified alpha-olefin polymer or at least one modified alpha-olefin polymer and at least one alpha-olefin polymer is dispersed in a matrix phase of the acetal resin as fine particles intimately adhering to the matrix phase although this may vary depending upon the blending ratio between the acetal resin and the modified $\alpha$-olefin polymer. The size of the dispersed fine particles constituting the composition is usually not more than 10 microns, preferably 5 to 0.1 micron, especially preferably 3 to 0.2 micron.

As required, the polyacetal resin composition of this invention may further contain an antioxidant, an ultraviolet absorber, a light protecting agent, a phosphite salt stabilizer, a peroxide decomposing agent, a basicity aid, a nucleus increasing agent, a plasticizer, a lubricant, an antistatic agent, a fire retardant, a pigment, a dye, or a filler such as carbon black, asbestos, glass fibers, potassium titanate whiskers, mica, kaolin, talc, silica and silica alumina. Another polymer may also be incorporated in the composition of this invention in amounts which do not impair the properties of the composition. These additives may be used in suitable amounts.

The acetal resin composition of this invention is prepared by melting and mixing the above ingredients by various methods. For example, the acetal resin and the modified alpha-olefin polymer are partly pre-mixed, and the mixture is then further mixed with the remainder; or all the acetal resin and the modified alpha-olefin polymer are mixed at a time. As required, the aforesaid additives such as an antioxidant may be added at any desired stage. Or the additives may be incorporated in the component resins beforehand.

The acetal resin composition of this invention has various excellent properties such as rigidity, impact strength, heat resistance and moldability. A composition obtained by preliminarily melt-mixing the modified alpha-olefin polymer with a part of the acetal resin, and melt-mixing the remainder of the acetal resin with the premixture has particularly excellent properties.

The melt-mixing may be carried out by known methods such as by using a single screw extruder, a twin screw extruder, a Banbury mixer, or a shell blender. The composition of this invention may be obtained in various shapes. Preferably, however, the composition is granulated into pellets by an extruder.

The resin composition obtained by the above melt-mixing operation may further be heat-aged as required. The heat-aging temperature is generally 50° to 200° C., preferably 80° to 170° C. If the heating temperature exceeds 200° C., the decomposition of the mixture is vigorous, and the mixture also undergoes coloration. If the heat-aging temperature is less than 50° C., no effect of improving the impact resistance and other properties of the composition by heat-aging can be secured, or an extremely long period of time is required to obtain this effect.

The heat-aging time may be at least 30 minutes, preferably at least 1 hour. The heat-aging time varies depending upon the heating temperature, and may generally be shorter as the heating temperature is higher. Heating can be effected by customary means. For example, heating may be effected by an electric heater or by high frequency heating or by using hot air. Hot air heating is preferred. Preferably, the heating atmosphere is an inert gaseous atmosphere, but is not necessarily limited thereto.

As a result of the heat aging, the various properties of the acetal resin composition, such as rigidily, impact strength, heat resistance and moldability, are improved further. In particular, an acetal resin composition obtained preliminarily by melt-mixing the modified alpha-olefin polymer and a part of the acetal resin, melt-mixing the remainder of the acetal resin with the premixture, and heat-aging the resulting composition has particularly excellent properties.

The acetal resin composition provided by this invention has a melt flow rate, MFR (190° C., 2160 load), of generally 0.1 to 50 g/10 min., preferably 0.2 to 30 g/10 min.

The acetal resin composition of this invention can be molded into various shapes by conventional known melt-molding methods such as injection molding, extrusion molding, compression molding, and foaming. The molded articles are used in a wide range of applications including, above all, automotive parts, electrical appliances and electrical component parts.

The following examples illustrate the present invention more specifically. In the present specification and the appended claims, the degree of crystallinity and the intrinsic viscosity [η] were measured by the following methods.

Degree of crystallinity: Measured at 23° C. by an X-ray diffraction method.
Intrinsic viscosity: Measured in decalin at 135° C.

EXAMPLE 1

Acetal resin (Duracon M25-01, a tradename for a product of Polyplastics Company; MFR 2.76 g/10 min.) and maleic anhydride-grafted ethylene/butene-1 copolymer ([η] 1.48 dl/g, density 0.88 g/cm$^3$, the degree of crystallinity 16%) obtained by graft-copolymerizing 100 parts by weight of ethylene/butene-1 copolymer (ethylene content 90 mole %, [η] 1.75 dl/g, density 0.88 g/cm$^3$, the degree of crystallinity 17%) with 0.9 part by weight of maleic anhydride were dry-blended by means of a blender in the proportions shown in Table 1. The dry-blended composition was fed into a single-screw extruder having an L/D ratio of 28 and a screw diameter of 25 mm and passed once through it at 190° C. and 50 rpm. The resulting pellets were heat-treated at 80° C. for 24 hours, and molded by an injection molding machine (Toshiba IS-50) to prepare test specimens for testing the properties. The properties of the specimens were evaluated by the following methods.

MFR: Measured at 190° C. under a load of 2160 g in accordance with ASTM D-1238-79.
Flexural test: A test specimen having a thickness of 3.2 mm was used, and its flexural modulus (FM, kg/cm$^2$) and flexural strength (FS, kg/cm$^2$) were measured.
Izod impact strength: A test specimen having a thickness of 3.2 mm was used, and its notched Izod impact strength (kg-cm/cm) at 23° C. was measured in accordance with ASTM D-256.
Delamination resistance: An injection-molded test specimen (123 mm × 12.7 mm × 3.2 mm) was bent, and its resistance to delamination was visually evaluated.

The results of these tests are summarized in Table 1.

EXAMPLES 2 TO 8 AND COMPARATIVE EXAMPLES 3 AND 4

In each run, a blend was prepared, and its properties were measured, in the same way as in Example 1 except that each of the modified alpha-olefin polymer indicated in Table 1 was used in the amount indicated. The results are shown in Table 1.

EXAMPLE 9

A blend was prepared, and its properties were measured, in the same way as in Example 1 except that the two modified alpha-olefin polymers shown in Table 1 were used in the proportions indicated. The results are shown in Table 1.

EXAMPLES 10 TO 12

In each run, a blend was prepared, and its properties were measured, in the same way as in Example 1 except that the modified alpha-olefin polymer and the unmodified alpha-olefin polymer shown in Table 1 were used in the proportions indicated. The results are shown in Table 1.

EXAMPLE 13

A blend was prepared, and its properties were measured, in the same way as in Example 1 except that acetal resin (Delrin 100, a tradename for a product of E. I. du Pont de Nemours & Co.; MFR 2.29 g/10 min.) and the modified alpha-olefin indicated in Table 1 were used in the amounts indicated in Table 1. The results are shown in Table 1.

COMPARATIVE EXAMPLES 1 AND 2

The properties of the acetal resins alone were evaluated, and are shown in Table 1.

COMPARATIVE EXAMPLES 5 TO 9

In each run, a blend was prepared, and its properties were measured, in the same way as in Example 1 except that the each of the unmodified alpha-olefin polymers shown in Table 1 was used in the amount indicated. The results are shown in Table 1.

The unmodified alpha-olefin polymer used in Comparative Example 9 was an ionomer (the degree of neutralization 60%; Zn ion).

TABLE 1

| Example (Ex.) or Comparative Example (CEx.) | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Substrate α-olefin polymer | Kind of α-olefin I | $C_2''$[1] | $C_2''$ | $C_2''$ | $C_2''$ | $C_2''$ | $C_2''$ | $C_2''$ | $C_2''$ | $C_2''$ | $C_2''$ | $C_2''$ |
| | Kind of α-olefin II | $C_4''$[2] | $C_4''$ | $C_4''$ | $C_3''$[3] | $C_3''$ | $C_3''$ | $C_3''$ | $C_3''$ | $C_3''$ | $C_4''$ | $C_4''$ |
| | Proportion of α-olefin I (mole %) | 90 | 90 | 90 | 80 | 80 | 45 | 61 | 80 | 99.5 | 98.1 | 90 |
| | Proportion of α-olefin II (mole %) | 10 | 10 | 10 | 20 | 20 | 55 | 36.7 | 20 | 0.5 | 1.9 | 10 |
| | Kind of the third component | * | * | * | * | * | * | ENB[6] | * | * | * | * |
| | Proportion of the third component (mole %) | * | * | * | * | * | * | 2.3 | * | * | * | * |
| | [η] (dl/g) | 1.75 | 1.75 | 1.75 | 2.39 | 2.39 | 3.10 | 1.88 | 2.39 | 2.01 | 2.10 | 1.75 |
| | Density (g/cm³) | 0.88 | 0.88 | 0.88 | 0.87 | 0.87 | 0.86 | 0.87 | 0.87 | 0.96 | 0.95 | 0.88 |
| | Degree of crystallinity (%) | 17 | 17 | 17 | 15 | 15 | 6 | 11 | 15 | 78 | 71 | 17 |
| Modified α-olefin polymer | Kind of the modifier | MAH[4] | MA[5] | Nadic Anhydride® | MAH | MAH | MAH | MAH | MAH | MAH | MAH | MAH |
| | Amount of the modifier (g/100 g of the substrate) | 0.9 | 0.2 | 0.5 | 0.1 | 2.5 | 0.5 | 0.5 | 0.9 | 0.2 | 0.3 | 0.9 |
| | [η] (dl/g) | 1.48 | 1.61 | 1.50 | 2.30 | 1.97 | 2.00 | 1.80 | 2.21 | 1.82 | 1.88 | 1.48 |
| | Density (g/cm³) | 0.88 | 0.88 | 0.88 | 0.87 | 0.87 | 0.86 | 0.86 | 0.87 | 0.96 | 0.95 | 0.88 |
| | Degree of crystallinity (%) | 16 | 16 | 16 | 15 | 15 | 6 | 10 | 15 | 76 | 70 | 16 |
| Unmodified α-olefin polymer | Kind of α-olefin I | | | | | | | | | $C_2''$ | $C_2''$ | $C_2''$ |
| | Kind of α-olefin II | | | | | | | | | $C_3''$ | $C_4''$ | $C_4''$ |
| | Proportion of α-olefin I (mole %) | | | | | | | | | 90 | 90 | 90 |
| | Proportion of α-olefin II (mole %) | | | | | | | | | 10 | 10 | 10 |
| | [η] (dl/g) | | | | | | | | | 1.48 | 1.48 | 1.48 |
| | Density (g/cm³) | | | | | | | | | 0.88 | 0.88 | 0.88 |
| | Degree of crystallinity (%) | | | | | | | | | 17 | 17 | 17 |
| Amounts mixed (parts by weight) | Acetal resin | 100[A] | 100[A] | 100[A] | 100[A] | 100[A] | 100[A] | 100[A] | 100[A] | 100[A] | 100[A] | 100[A] |
| | Modified α-olefin polymer | 25 | 25 | 25 | 25 | 25 | 25 | 25 | 40 | 20 | 20 | 20 |
| | Unmodified α-olefin polymer | * | * | * | * | * | * | * | * | * | * | * |
| Properties of the composition | MFR (g/10 min.) | 1.26 | 1.25 | 1.23 | 1.46 | 1.12 | 2.00 | 1.03 | 0.90 | 1.23 | 1.23 | 1.47 |
| | FM (kg/cm²) | 15600 | 15400 | 15500 | 14800 | 14700 | 14500 | 15000 | 11800 | 13200 | 14500 | 12000 |
| | FS (kg/cm²) | 482 | 483 | 487 | 470 | 464 | 460 | 480 | 355 | 423 | 460 | 383 |
| | Izod impact strength (kg·cm/cm) | 15.2 | 14.0 | 12.0 | 12.8 | 13.6 | 10.5 | 13.1 | 73.2 | 61.2 | 20.1 | 36.5 |
| | Delamination resistance | O | O | O | O | O | O | O | O | O | O | O |

| Example (Ex.) of Comparative Example (CEx.) | | Ex. 12 | Ex. 13 | CEx. 1 | CEx. 2 | CEx. 3 | CEx. 4 | CEx. 5 | CEx. 6 | CEx. 7 | CEx. 8 | CEx. 9 |
|---|---|---|---|---|---|---|---|---|---|---|---|---|
| Substrate α-olefin polymer | Kind of α-olefin I | $C_2''$ | $C_2''$ | * | * | $C_2''$ | $C_2''$ | * | $C_3''$ | $C_2''$ | $C_2''$ | * |
| | Kind of α-olefin II | $C_4''$ | $C_4''$ | * | * | $C_4''$ | $C_4''$ | * | $C_4''$ | Vinyl acetate | $C_3''$ | * |
| | Proportion of α-olefin I (mole %) | 90 | 90 | * | * | 90 | 90 | * | 80 | 98.1 | 99.5 | * |
| | Proportion of α-olefin II (mole %) | 10 | 10 | * | * | 10 | 10 | * | 20 | | 0.5 | * |
| | Kind of the third component | * | * | * | * | * | * | * | * | * | * | * |
| | Proportion of the third component (mole %) | * | * | * | * | * | * | * | * | * | * | * |
| | [η] (dl/g) | 1.75 | 1.75 | | | 3.5 | 3.5 | | | | 2.01 | |
| | Density (g/cm³) | 0.88 | 0.88 | | | 0.88 | 0.88 | | | | 0.96 | |
| | Degree of crystallinity (%) | 17 | 17 | | | 17 | 17 | | | | 78 | |
| Modified α-olefin polymer | Kind of the modifier | MAH | MAH | | | MAH | MAH | | | | MMA[7] | |
| | Amount of the modifier (g/100 g of the substrate) | 0.9 | 0.9 | | | 0.9 | 12 | | | | 93 | |
| | [η] (dl/g) | 1.48 | 1.48 | | | 2.21 | 2.00 | | | | | |
| | Density (g/cm³) | 0.88 | 0.88 | | | 0.88 | 0.88 | | | | | |
| | Degree of crystallinity (%) | 16 | 16 | | | 16 | 16 | | | | | |
| Unmodified α-olefin polymer | Kind of α-olefin I | $C_2''$ | * | * | * | * | * | $C_2''$ | * | $C_2''$ | $C_2''$ | $C_2''$ |
| | Kind of α-olefin II | * | * | * | * | * | * | * | * | Vinyl acetate | MMA | |
| | Proportion of α-olefin I (mole %) | 80 | | | | | | 80 | | 98.1 | 93 | 95.8 |

Footnotes: [1] $C_2''$ = ethylene; [2] $C_4''$ = butene; [3] $C_3''$ = propylene; [4] MAH = maleic anhydride; [5] MA = maleic acid; [6] ENB = ethylidene norbornene; [7] MMA = methyl methacrylate; [A] parts TABLE 1-continued

| | | | | | | | | | | | | |
|---|---|---|---|---|---|---|---|---|---|---|---|---|
| | Proportion of α-olefin II (mole %) | 20 | * | * | * | * | * | 20 | * | * | 7 | 95.8 |
| | [η] (dl/g) | 2.39 | * | * | * | * | 2.50 | 2.39 | 2.10 | 2.50 | 1.56 | — |
| | Density (g/cm³) | 0.87 | * | * | * | * | 0.91 | 0.87 | 0.95 | 0.91 | 0.94 | 0.96 |
| | Degree of crystallinity (%) | 15 | * | * | * | * | 68 | 15 | 71 | 68 | 36 | 27 |
| Amounts mixed (parts by weight) | Acetal resin | 100ᴬ | 100ᴮ | 100ᴬ | 100ᴮ | 100ᴬ | 100ᴬ | 100ᴬ | 100ᴬ | 100ᴬ | 100ᴬ | 100ᴬ |
| | Modified α-olefin polymer | 20 | 40 | * | * | * | 40 | 40 | 40 | 40 | 40 | 40 |
| | Unmodified α-olefin polymer | 20 | * | * | * | * | * | * | * | * | * | * |
| Properties of the composition | MFR (g/10 min.) | 0.93 | 0.85 | 2.76 | 2.29 | 2.31 | 0.21 | 1.56 | 2.87 | 2.52 | 3.12 | 2.62 |
| | FM (kg/cm²) | 12700 | 14000 | 26500 | 31800 | 450 | 11500 | 11700 | 20400 | 19100 | 13100 | 12800 |
| | FS (kg/cm²) | 357 | 470 | 837 | 954 | 25 | 362 | 374 | 631 | 597 | 398 | 370 |
| | Izod impact strength (kg-cm/cm) | 42.4 | 71.5 | 5.4 | 6.6 | Not destroyed | 6.1 | 5.1 | 2.1 | 3.8 | 5.2 | 4.8 |
| | Delamination resistance | O | O | O | O | O | X | X | X | X | X | X |

NOTE:
[1]Ethylene
[2]Butene-1
[3]Propylene
[4]Maleic anhydride
[5]Maleic acid
[6]5-Ethylidene-2-norbornene
[7]Methyl methacrylate
ᴬDuracon M25-01 (a product of Polyplastics Company; MFR 2.76 g/10 min.)
ᴮDelrin 100 (a product of E. I. du Pont de Nemours & Co; MFR 2.29 g/10 min.)

EXAMPLES 14 TO 16

In each run, acetal resin (Duracon M25-01, a tradename for a product of Polyplastics Company; MFR 2.76 g/10 min.) and maleic anhydride-grafted ethylene/butene-1 copolymer ([η] 1.48 dl/g, density 0.88 g/cm$^3$, the degree of crystallinity 16%) obtained by graft-copolymerizing 100 parts by weight of ethylene/butene-1 copolymer (ethylene content 90 mole %, [η] 1.75 dl/g, density 0.88 g/cm$^3$, the degree of crystallinity 17%) with 0.9 part by weight of maleic anhydride were dry-blended by means of a blender in the proportions shown in Table 2. The dry-blended composition was fed into a single-screw extruder having an L/D ratio of 28 and a screw diameter of 25 mm and passed once through it at 190° C. and 50 rpm. The resulting pellets were treated with hot air at 100° C. for 20 hours in a nitrogen atmosphere, and then molded by an injection molding machine (Toshiba IS-50) to prepare specimens for testing the properties. The properties of the specimens were evaluated in the same way as in Example 1.

EXAMPLES 17 TO 19

In each run, a blend was prepared, and its properties were evaluated, in the same way as in Example 16, except that the resulting composition was heat-treated under the conditions shown in Table 2 before molding. The results are shown in Table 2.

EXAMPLES 20 TO 24 AND COMPARATIVE EXAMPLES 12 AND 13

In each run, a blend was prepared and heat-treated, and its properties were evaluated, in the same way as in Example 14 except that each of the modified alpha-olefin polymers shown in Table 2 was used in the proportion indicated. The results are shown in Table 2.

EXAMPLE 25

A blend was prepared, and its properties were measured, in the same way as in Example 14 except that the two modified alpha-olefin polymers shown in Table 2 were used in the proportions indicated. The results are shown in Table 2.

EXAMPLES 26 TO 28

In each run, a blend was prepared, and its properties were measured, in the same way as in Example 14 except that each of the modified alpha-olefin polymers and unmodified alpha-olefin polymers shown in Table 2 was used in the proportion indicated in Table 2. The results are shown in Table 2.

EXAMPLE 29

A blend was prepared, and its properties were measured, in the same way as in Example 14 except that acetal resin (Duracon M90-01, a tradename for a product of Polyplastics Company, MFR 9.07 g/10 min.) was used in the proportion shown in Table 2. The results are shown in Table 2.

EXAMPLES 30 AND 31

A blend was prepared as in Example 14 and Example 16, and without heat-treatment, its properties were evaluated. The results are shown in Table 2.

COMPARATIVE EXAMPLES 10 AND 11

The polyacetal resins alone were heat-reacted under the conditions shown in Table 2, and their properties were respectively measured. The results are shown in Table 2.

COMPARATIVE EXAMPLES 14 TO 18

In each run, a blend was prepared in the same was as in Example 14 except that each of the unmodified alpha-olefin polymers shown in Table 2 was used in the proportion indicated in Table 2, and its properties were measured as in Example 1. The results are shown in Table 2.

The unmodified alpha-olefin polymer used in Comparative Example 19 was an ionomer (degree of neutralization 60%, Zn ion).

TABLE 2

| Example (Ex.) or Comparative Example (CEx.) | | Ex. 14 | Ex. 15 | Ex. 16 | Ex. 17 | Ex. 18 | Ex. 19 | Ex. 20 |
|---|---|---|---|---|---|---|---|---|
| Substrate α-olefin polymer | Kind of α-olefin I | C$_2''^1$ | | | | | | C$_2''$ |
| | Kind of α-olefin II | C$_4''^2$ | | | | | | C$_4''$ |
| | Proportion of α-olefin I | 90 | | | | | | 90 |
| | Proportion of α-olefin II | 10 | | | | | | 10 |
| | Kind of the third component | * | → | → | → | → | → | * |
| | Proportion of the third component | * | | | | | | * |
| | [η] (dl/g) | 1.75 | | | | | | 1.75 |
| | Density (g/cm$^3$) | 0.88 | | | | | | 0.88 |
| | Degree of crystallinity (%) | 17 | | | | | | 17 |
| Modified α-olefin polymer | Kind of the modifier | MAH$^4$ | | | | | | Nadic Anhydride ® |
| | Amount of the modifier (g/100 g of substrate) | 0.9 | | | | | | 0.5 |
| | [η] (dl/g) | 1.48 | → | → | → | → | → | 1.50 |
| | Density (g/cm$^3$) | 0.88 | | | | | | 0.88 |
| | Degree of crystallinity (%) | 16 | | | | | | 16 |
| Unmodified α-olefin polymer | Kind of α-olefin I | * | | | | | | |
| | Kind of α-olefin II | * | | | | | | |
| | Proportion of α-olefin I (mole %) | * | | | | | | |
| | Proportion of α-olefin II (mole %) | * | → | → | → | → | → | → |
| | [η] (dl/g) | * | | | | | | |
| | Density (g/cm$^3$) | * | | | | | | |
| | Degree of crystallinity (%) | * | | | | | | |
| Amounts mixed (parts by weight) | Acetal resin | 100$^A$ | 100$^A$ | 100$^A$ | 100$^A$ | 100$^A$ | 100$^A$ | 100$^A$ |
| | Modified α-olefin polymer | 10 | 25 | 40 | 40 | 40 | 40 | 25 |
| | Unmodified α-olefin polymer | * | * | * | * | * | * | * |
| Heating conditions | Temperature (°C.) | 100 | 100 | 100 | 170 | 150 | 80 | 100 |
| | Time (hours) | 20 | 20 | 20 | 2 | 5 | 24 | 20 |
| Properties of the | MFR (g/10 min.) | 1.64 | 1.06 | 0.63 | 0.81 | 1.22 | 0.90 | 1.22 |
| | FM (kg/cm$^2$) | 20500 | 14700 | 11400 | 11700 | 11500 | 11800 | 15300 |

TABLE 2-continued

| composition | | | | | | | | |
|---|---|---|---|---|---|---|---|---|
| | FS (kg/cm$^2$) | 627 | 474 | 350 | 357 | 351 | 355 | 487 |
| | Izod impact strength (kg-cm/cm) | 11.2 | 33.9 | N.B. | 43.9 | N.B. | 73.2 | 12.8 |
| | Delamination resistance | O | O | O | O | O | O | O |

| Example (Ex.) or Comparative Example (CEx.) | | Ex. 21 | Ex. 22 | Ex. 23 | Ex. 24 | Ex. 25 | | Ex. 26 | Ex. 27 |
|---|---|---|---|---|---|---|---|---|---|
| Substrate α-olefin polymer | Kind of α-olefin I | C$_2''$ | C$_2''$ | C$_2''$ | C$_2''$ | C$_2''$ | C$_2''$ | C$_2''$ | C$_2''$ |
| | Kind of α-olefin II | C$_3''^3$ | C$_3''^3$ | C$_3''$ | C$_3''$ | C$_4''$ | C$_3''$ | C$_4''$ | C$_4''$ |
| | Proportion of α-olefin I | 80 | 80 | 45 | 61 | 90 | 99.5 | 98.1 | 90 |
| | Proportion of α-olefin II | 20 | 20 | 55 | 36.7 | 10 | 0.5 | 1.9 | 10 |
| | Kind of the third component | * | * | * | ENB$^5$ | * | * | * | * |
| | Proportion of the third component | * | * | * | 2.3 | * | * | * | * |
| | [η] (dl/g) | 2.39 | 2.39 | 3.10 | 1.88 | 1.75 | 2.01 | 2.10 | 1.75 |
| | Density (g/cm$^3$) | 0.87 | 0.87 | 0.86 | 0.87 | 0.88 | 0.96 | 0.95 | 0.88 |
| | Degree of crystallinity (%) | 15 | 15 | 6 | 11 | 17 | 78 | 71 | 17 |
| Modified α-olefin polymer | Kind of the modifier | MAH | MAH | MAH | MAH | MAH | MAH | MAH | MAH |
| | Amount of the modifier (g/100 g of substrate) | 0.1 | 2.5 | 0.5 | 0.5 | 0.9 | 0.2 | 0.3 | 0.9 |
| | [η] (dl/g) | 2.30 | 1.97 | 2.00 | 1.80 | 1.48 | 1.82 | 1.88 | 1.48 |
| | Density (g/cm$^3$) | 0.87 | 0.87 | 0.86 | 0.86 | 0.88 | 0.96 | 0.95 | 0.88 |
| | Degree of crystallinity (%) | 15 | 15 | 6 | 10 | 16 | 76 | 70 | 16 |
| Unmodified α-olefin polymer | Kind of α-olefin I | | | * | | | | C$_2''$ | C$_2''$ |
| | Kind of α-olefin II | | | * | | | | C$_4''$ | C$_4''$ |
| | Proportion of α-olefin I (mole %) | | | * | | | | 90 | 90 |
| | Proportion of α-olefin II (mole %) | → | → | * | → | | → | 10 | 10 |
| | [η] (dl/g) | | | * | | | | 1.48 | 1.48 |
| | Density (g/cm$^3$) | | | * | | | | 0.88 | 0.88 |
| | Degree of crystallinity (%) | | | * | | | | 17 | 17 |
| Amounts mixed (parts by weight) | Acetal resin | 100$^A$ | 100$^A$ | 100$^A$ | 100$^A$ | 100$^A$ | | 100$^A$ | 100$^A$ |
| | Modified α-olefin polymer | 25 | 25 | 25 | 25 | 30/10 | | 20 | 20 |
| | Unmodified α-olefin polymer | * | * | * | * | * | | 20 | 20 |
| Heating conditions | Temperature (°C.) | 100 | 100 | 100 | 100 | 100 | | 100 | 100 |
| | Time (hours) | 20 | 20 | 20 | 20 | 20 | | 20 | 20 |
| Properties of the composition | MFR (g/10 min.) | 1.45 | 1.12 | 2.00 | 1.02 | 0.72 | | 1.03 | 1.32 |
| | FM (kg/cm$^2$) | 14900 | 14700 | 14500 | 14800 | 13100 | | 14300 | 12100 |
| | FS (kg/cm$^2$) | 472 | 464 | 462 | 471 | 422 | | 462 | 380 |
| | Izod impact strength (kg-cm/cm) | 15.4 | 32.4 | 15.1 | 13.9 | 63.5 | | 21.5 | N.B. |
| | Delamination resistance | O | O | O | O | O | | O | O |

| Example (Ex.) or Comparative Example (CEx.) | | Ex. 28 | Ex. 29 | Ex. 30 | Ex. 31 | CEx. 10 | CEx. 11 | CEx. 12 |
|---|---|---|---|---|---|---|---|---|
| Substrate α-olefin polymer | Kind of α-olefin I | C$_2''$ | C$_2''$ | C$_2''$ | C$_2''$ | * | | C$_2''$ |
| | Kind of α-olefin II | C$_4''$ | C$_4''$ | C$_4''$ | C$_4''$ | * | → | C$_4''$ |
| | Proportion of α-olefin I | 90 | 90 | 90 | 90 | * | | 90 |
| | Proportion of α-olefin II | 10 | 10 | 10 | 10 | * | | 10 |
| | Kind of the third component | * | * | * | * | * | | * |
| | Proportion of the third component | * | * | * | * | * | | * |
| | [η] (dl/g) | 1.75 | 1.75 | 1.75 | 1.75 | * | | 2.40 |
| | Density (g/cm$^3$) | 0.88 | 0.88 | 0.88 | 0.88 | * | | 0.88 |
| | Degree of crystallinity (%) | 17 | 17 | 17 | 17 | * | | 17 |
| Modified α-olefin polymer | Kind of the modifier | MAH | MAH | MAH | MAH | * | | MAH |
| | Amount of the modifier (g/100 g of substrate) | 0.9 | 0.9 | 0.9 | 0.9 | * | | 0.9 |
| | [η] (dl/g) | 1.48 | 1.48 | 1.48 | 1.48 | * | → | 2.05 |
| | Density (g/cm$^3$) | 0.88 | 0.88 | 0.88 | 0.88 | * | | 0.88 |
| | Degree of crystallinity (%) | 16 | 16 | 16 | 16 | * | | 16 |
| Unmodified α-olefin polymer | Kind of α-olefin I | C$_2''$ | * | * | * | | | * |
| | Kind of α-olefin II | C$_3''$ | * | * | * | | | * |
| | Proportion of α-olefin I (mole %) | 80 | * | * | * | | | * |
| | Proportion of α-olefin II (mole %) | 20 | * | * | * | → | → | * |
| | [η] (dl/g) | 2.39 | * | * | * | | | * |
| | Density (g/cm$^3$) | 0.87 | * | * | * | | | * |
| | Degree of crystallinity (%) | 15 | * | * | * | | | * |
| Amounts mixed (parts by weight) | Acetal resin | 100$^A$ | 100$^B$ | 100$^A$ | 100$^A$ | 100$^A$ | 100$^B$ | 100$^A$ |
| | Modified α-olefin polymer | 20 | 25 | 10 | 40 | * | * | 300 |
| | Unmodified α-olefin polymer | 20 | * | * | * | * | * | * |
| Heating conditions | Temperature (°C.) | 100 | 100 | * | * | 100 | 100 | 100 |
| | Time (hours) | 20 | 20 | * | * | 20 | 20 | 20 |
| Properties of the composition | MFR (g/10 min.) | 0.70 | 3.59 | 2.41 | 1.80 | 2.76 | 9.07 | 0.25 |
| | FM (kg/cm$^2$) | 12300 | 17400 | 22900 | 11000 | 26500 | 29800 | 430 |
| | FS (kg/cm$^2$) | 359 | 536 | 705 | 373 | 837 | 958 | 24 |
| | Izod impact strength (kg-cm/cm) | N.B. | 14.0 | 8.5 | 12.5 | 5.4 | 5.0 | N.B. |
| | Delamination resistance | O | O | O | X | O | O | O |

| Example (Ex.) or Comparative Example (CEx.) | | CEx. 13 | CEx. 14 | CEx. 15 | CEx. 16 | CEx. 17 | CEx. 18 |
|---|---|---|---|---|---|---|---|
| Substrate α-olefin polymer | Kind of α-olefin I | C$_2''$ | * | * | * | * | * |
| | Kind of α-olefin II | C$_4''$ | * | * | * | * | * |
| | Proportion of α-olefin I | 90 | * | * | * | * | * |
| | Proportion of α-olefin II | 10 | * | * | * | * | * |
| | Kind of the third component | * | * | * | * | * | * |
| | Proportion of the third component | * | * | * | * | * | * |
| | [η] (dl/g) | 2.40 | * | * | * | * | * |
| | Density (g/cm$^3$) | 0.88 | * | * | * | * | * |
| | Degree of crystallinity (%) | 17 | * | * | * | * | * |

TABLE 2-continued

| | | | | | | | |
|---|---|---|---|---|---|---|---|
| Modified α-olefin polymer | Kind of the modifier | MAH | * | * | * | * | * |
| | Amount of the modifier (g/100 g of substrate) | 12 | * | * | * | * | * |
| | [η] (dl/g) | 1.92 | * | * | * | * | * |
| | Density (g/cm$^3$) | 0.88 | * | * | * | * | * |
| | Degree of crystallinity (%) | 16 | * | * | * | * | * |
| Unmodified α-olefin polymer | Kind of α-olefin I | * | $C_2$" | $C_3$" | $C_2$" | $C_2$" | $C_2$" |
| | Kind of α-olefin II | * | $C_3$" | * | $C_4$" | Vinyl acetate | MMA[6] |
| | Proportion of α-olefin I (mole %) | * | 80 | 100 | 98.1 | 93 | 95.8 |
| | Proportion of α-olefin II (mole %) | * | 20 | * | 1.9 | 7 | 4.2 |
| | [η] (dl/g) | * | 2.39 | 2.50 | 2.10 | 1.56 | — |
| | Density (g/cm$^3$) | * | 0.87 | 0.91 | 0.95 | 0.94 | 0.96 |
| | Degree of crystallinity (%) | * | 15 | 68 | 71 | 36 | 27 |
| Amounts mixed (parts by weight) | Acetal resin | 100[A] | 100[A] | 100[A] | 100[A] | 100[A] | 100[A] |
| | Modified α-olefin polymer | 40 | * | * | * | * | * |
| | Unmodified α-olefin polymer | * | 40 | 40 | 40 | 40 | 40 |
| Heating conditions | Temperature (°C.) | 100 | 100 | 100 | 100 | 100 | 100 |
| | Time (hours) | 20 | 20 | 20 | 20 | 20 | 20 |
| Properties of the composition | MFR (g/10 min.) | 0.21 | 1.49 | 2.85 | 2.48 | 3.10 | 2.59 |
| | FM (kg/cm$^2$) | 11800 | 11600 | 20000 | 19000 | 13200 | 12600 |
| | FS (kg/cm$^2$) | 367 | 370 | 629 | 595 | 391 | 372 |
| | Izod impact strength (kg-cm/cm) | 6.3 | 5.4 | 2.0 | 3.5 | 4.9 | 4.5 |
| | Delamination resistance | X | X | X | X | X | X |

NOTE:
[1]Ethylene
[2]Butene-1
[3]Propylene
[4]Maleic anhydride
[5]5-Ethylidene-norbornene
[6]Methyl methacrylate
[A]Duracon M25-01 (a product of Polyplastics Company; MFR 2.76 g/10 min.)
[B]Duracon M90-01 (a product of Polyplastics Company; MFR 9.07 g/10 min.)

What is claimed is:

1. An acetal resin composition comprising
   (A) 100 parts by weight of an acetal resin containing at least 80 mole percent of oxymethylene units in the main chain and having a melt flow rate of 0.1 to 50 g/10 min., and
   (B) 1 to 200 parts by weight of at least one graft modified alpha-olefin polymer which has
      (a) a degree of crystallinity of from 0 to 85%,
      (b) an intrinsic viscosity in decalin at 135° C. of from 0.5 to 7 dl/g, and
      (c) a molecular weight distribution ($\overline{Mw}/\overline{Mn}$) of from 1.5 to 30, and
      (d) wherein the at least one graft modified polymer is a graft-copolymerization product of 100 parts by weight of an alpha-olefin polymer and 0.01 to 10 parts by weight of an unsaturated mono or dicarboxylic acid having from 3 to 20 carbon atoms or the anhydrides, lower alkyl esters, amides, imides and halides thereof, and
      (e) is dispersed in the acetal resin (A) as particles having a particle size of not more than 10 microns.

2. The composition of claim 1 wherein the modified alpha-olefinic polymer (B) is obtained by grafting 0.05 to 5 parts by weight of the unsaturated carboxylic acid or its derivative to 100 parts by weight of the alpha-olefin polymer.

3. The composition of claim 1 wherein the unsaturated carboxylic acid or its derivative is selected from the group consisting of maleic acid and endocisbicyclo[2.2.1]hept-5-ene-2,3-dicarboxylic acid and their anhydrides.

4. The composition of claim 1 wherein the alpha-olefin polymer is an alpha-olefin elastomeric polymer having a degree of crystallinity of not more than 30%, an intrinsic viscosity [η] in decalin at 135° C. of 0.5 to 7 dl/g and a glass transition temperature of not more than 0° C.

5. The composition of claim 1 wherein the alpha-olefin polymer is a crystalline alpha-olefin polymer having a degree of crystallinity of 35 to 80%, an intrinsic viscosity [η] in decalin at 135° C. 0.5 to 7 dl/g and a melting point of about 80° C. to about 280° C.

6. The composition of claim 1 wherein the alpha-olefin polymer is selected from the group consisting of ethylene/propylene copolymer, ethylene/1-butene copolymer, ethylene/propylene/diene terpolymer, and ethylene/1-butene/diene terpolymer.

7. The composition of claim 1 wherein the modified alpha-olefin polymer has a degree of crystallinity of not more than 20%, an intrinsic viscosity [η] in decalin at 135° C. of 0.5 to 7 dl/g, a molecular weight distribution ($\overline{Mw}/\overline{Mn}$) of 1.5 to 30 and a glass transition temperature of not more than 0° C.

8. The composition of claim 1 wherein the modified alpha-olefin polymer or a blend of at least two modified alpha-olefin polymers has a degree of crystallinity of not more than 50%.

9. The composition of claim 1 wherein the modified alpha-olefin polymer or a blend of at least two modified alpha-olefin polymers has a tensile modulus of 5 to 17000 kg/cm$^2$.

10. The composition of claim 1 wherein the modified alpha-olefin polymer (B) is contained in an amount of 5 to 100 parts by weight per 100 parts by weight of the acetal resin (A).

11. The composition of claim 8 which further comprises 1 to 1000 parts by weight of an unmodified alpha-olefin polymer.

12. The composition of claim 11 wherein the unsaturated carboxylic acid or its derivative is contained in a proportion of 0.01 to 8% by weight based on the total weight of the modified alpha-olefin polymer (B) and the unmodified alpha-olefin polymer.

13. The composition of claim 1 which has been heat-aged at a temperature of 50° C. to 200° C. for at least 30 minutes.

14. The composition of claim 13 wherein the heat-aging is carried out for at least 1 hour.

15. The composition of claim 1, wherein the acetal resin (A) contains at least 90 mole % of oxymethylene units in the main chain and has a melt flow rate of 0.2 to 30 g/10 min.

16. The composition of claim 1 wherein the unsaturated carboxylic acid is selected from the group consisting of acrylic acid, methacrylic acid, alpha-ethylacrylic acid, maleic acid, fumaric acid, itaconic acid, citraconic acid, tetrahydrophthalic acid, endocisbicyclo[2.2.1-]hept-5-ene-2,3-dicarboxylic acid, methyl-endocisbicyclo[2.2.1]hept-5-ene-2,3-dicarboxylic acid, and the anhydrides, lower alkyl esters, amides, imides and halides thereof.

17. The composition of claim 1 wherein the at least one graft modified alpha-olefin polymer (B) has
   (a) a degree of crystallinity of from 1 to 80%,
   (b) an intrinsic viscosity in decalin at 135° C. of 0.7 to 5 dl/g, and
   (c) a molecular weight distribution of from 2.0 to 25.

18. The composition of claim 17 wherein the modified alpha-olefin polymer has a degree of crystallinity of from 1 to 19%.

* * * * *